United States Patent [19]

Benest

[11] Patent Number: 4,934,290

[45] Date of Patent: Jun. 19, 1990

[54] MOBILE PLANTER

[76] Inventor: Roger S. Benest, Manor House Farm, Rue De Bas, St. Lawrence, Jersey, United Kingdom

[21] Appl. No.: 260,875

[22] Filed: Oct. 21, 1988

[30] Foreign Application Priority Data

Oct. 21, 1987 [GB] United Kingdom ............... 8724699
Nov. 27, 1987 [GB] United Kingdom ............... 8727884

[51] Int. Cl.$^5$ ............................................. A01C 11/02
[52] U.S. Cl. ................................. 111/105; 111/109; 111/77; 111/177; 221/265; 172/101
[58] Field of Search ............... 172/776, 101, 451, 456, 172/446, 462, 482, 694, 695, 705–707; 221/263, 82, 86, 89, 265, 122; 198/481.1; 414/507; 111/2, 3, 7, 34, 77, 85

[56] References Cited

U.S. PATENT DOCUMENTS

| | | | |
|---|---|---|---|
| 510,925 | 12/1893 | Moore et al. | 111/3 |
| 2,053,390 | 9/1936 | Bateman et al. | 111/77 |
| 2,637,287 | 5/1953 | Strauss | 111/3 |
| 2,937,705 | 5/1960 | Kirchner et al. | 172/776 |
| 3,680,172 | 8/1972 | Couser | 172/776 |
| 3,757,992 | 9/1973 | Cruickshank | 221/263 |
| 3,899,985 | 8/1975 | Rath | 111/3 |

FOREIGN PATENT DOCUMENTS

| | | | |
|---|---|---|---|
| 182552 | 7/1955 | Austria | 111/34 |
| 1103674 | 3/1960 | Fed. Rep. of Germany | 111/34 |
| 1438053 | 6/1976 | United Kingdom | |

OTHER PUBLICATIONS

Miller Manufacturing Co., "Heavy-Duty Rigid Offset Disc Series II".

*Primary Examiner*—Danton D. DeMille
*Attorney, Agent, or Firm*—Darby & Darby

[57] ABSTRACT

A planter for placement of plants in spaced parallel rows in the soil has a plant dispenser fed manually or automatically from a plant supply and delivering to a furrow-opening coulter assembly and press wheels. The plant dispenser comprises a drum having an internal impeller defining plant-receiving chutes through which the plants pass, and thence downwards and outwards through an opening in the drum. The coulter assembly has reciprocated coulter side plates which receive and support each plant in a receiving zone between them, and by forward movement relative to the plant and relative to a fixed placement member located in front of the plant, allow soil to flow back to cover the plant's root ball. The press wheels are mounted with a variable caster angle to vary their soil-gathering affect. A hitch has twin parallel toolbars whereby the row units are freely laterally position-adjustable even across the tractor hitch.

11 Claims, 3 Drawing Sheets

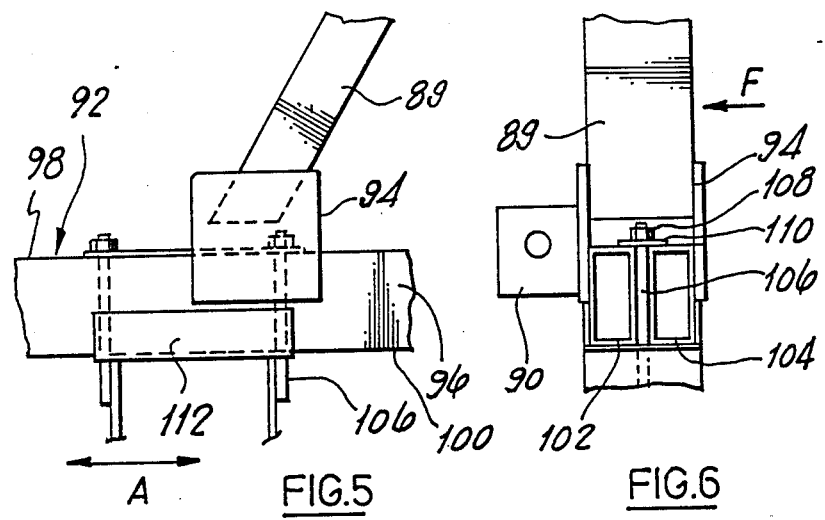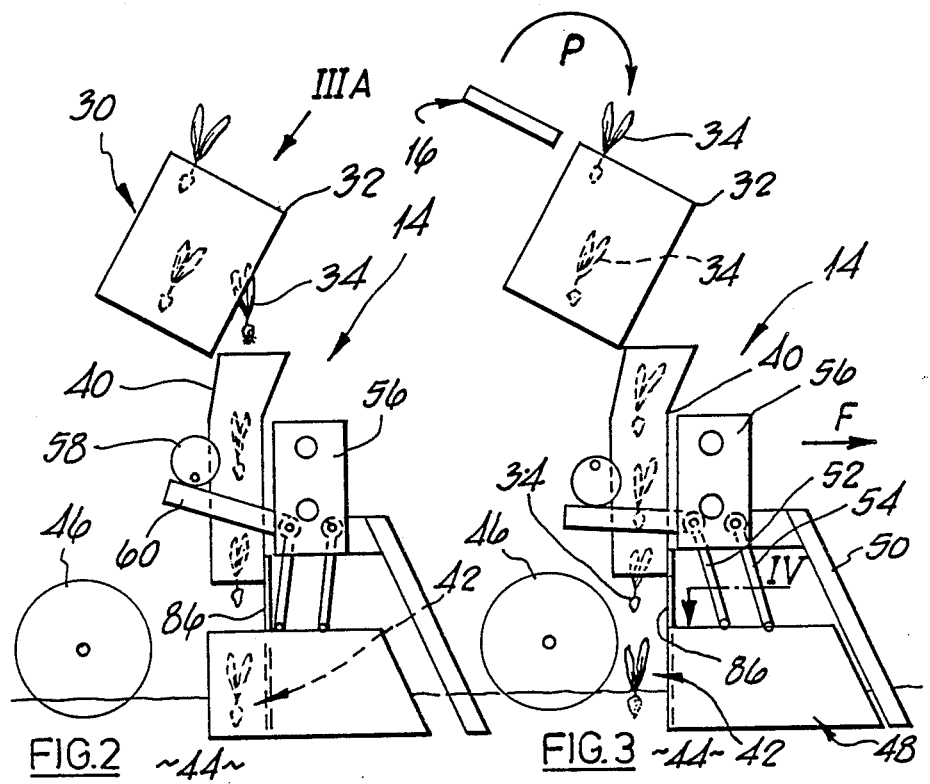

MOBILE PLANTER

This invention relates to mobile planters for placing plants in the ground, to dispensing mechanisms for such planters, for dispensing plants from a supply to a plant placement mechanism at regular intervals as the planter progresses, to the plant placement mechanism itself and the soil press wheel assembly thereof, and to the hitching arrangements for such a planter.

In agriculture and horticulture there is a requirement for high speed transplanting of plants. Such plants are grown from seed to a size at which they can be handled by manual or automatic manipulation of the vegetative part. They are transported to the field of work in moulded plastic trays. Each tray has a large number of individual recesses each containing a quantity of plan growing medium in which a seedling has been growing, and from which the seedling and its root ball incorporating the plant growing medium (the assembly being known as a module) can be removed by pulling. There is a requirement for planting, for example, approximately 100,000 plants per working day with a planting machine drawn by a tractor and having several operatives handling the plants for the individual rows being planted by the machine.

A first aspect of the invention, concerns the need for improvements in the mechanism for placement of plants in furrows in the soil. Previous proposals provide for each plant to be deposited between the side plates of the coulter assembly, which temporarily support the plant, whereupon it is pushed out rearwards by a reciprocated ejector plate to its final resting place, to make room for the next plant.

This arrangement suffers from various shortcommings including the fact that soil fills back into the furrow behind the coulter before the plant reaches its destined location. As a result the plant is effectively pushed out inot a furrow which has already been at least partially refilled with soil. In consequence, it not infrequently happens that the plant ends up with its roots on top of the soil, and since it is in any case laterally unsupported at this stage, the plant in such a case will usually be at an attitude other than the desired upright one. The phenomenon will perhaps be more readily understood if consideration is given to the inherent dynamics of the movement of the reciprocated ejector or placement plate. Even at a planter ground speed of only 1 mph (8/5 kph) if the plant spacing in the row is only a few inches, the ejector plate will have to move at a speed so as to make a full reciprocative movement in the time taken for the planter to move a few inches. As a result, the ejector needs to move significantly faster than the planter ground speed and it therefore imparts significant momentum to each plant, which likewise is not favorable to achieving a stable and perdetermined placement of the plant. Also, the mechanism is unduly influenced by the varying effect of gravity on undulating terrain. Moreover, the ejector plate is inclined to become jammed with soil and/or plant material, particularly when the next plant drops before the plate has returned to its starting position.

An object of this aspect of the present invention is to provide a mobile planter for placing plants in the ground, offering improvements in relation to one or more of the matters discussed above, or generally.

According to this aspect of the invention there is provided a mobil planter for placing plants as defined in the accompanying claims. The invention also provides a method of placing plants in the ground as defined and/or disclosed herein.

In a preferred embodiment of the invention, the new approach to the placement of plants provided by the invention has the effect that instead of ejecting plants from the coulter by means of an ejector or placement member, the latter remains relatively static with respect to the planter chassis. To place the plant in its growing position, the plant is received in the previously proposed way, by dropping into the coulter and being located thereby in an upright attitude, but placement in the furrow is effected by the coulter moving forward relative to the placement menber until the latter is in line with the rear end of the coulter. With the plant still in contact with the placement member and at the bottom of the furrow the soil then returns to the furrow covering the plant root ball, the latter being static on the base of the furrow. Also, becawuse there is no displacement momentum applied to the plant, the slope of a field during use does not affect it. Moreover, the press wheels are located closer to the rear end of the coulter so as to press and gather the soil around the plant at the rear end of the coulter. This would not be possible with previously proposed planters as this would accentuate the tendency of the soil to fill the furrow before the plant is in position.

In the embodiment, the coulter is generally V-shaped in vertical section, to receive the plant modules, and to produce a V-section furrow. Drive to the mechanism for reciprocating the coulter is from a land wheel via a gear box and a torque limiter to a cross-shaft connected to the row units. The coulters are mounted on parallelogram linkages. The coulter has a self-cleaning action due to its acceleration and the persence of the placement plate. A cam drive may provide positive drive to the coulter only in the forward direction of movement of the coulter, with return thereof being produced by soil forces. Alternatively, a cam return drive mechanism may be provided in any case or for low soil load conditions.

A second aspect of the present invention concerns the dispensing of plants, or modules, from their trays to the assembly which places them in furrows in the soil.

Previous proposals in this regard include the use of a rotatable assembly of plant-receiving tubes into which plants are manually placed by an operative, each tube having a cam-operated trap mechanism for releasing the plant at the appropriate time. Other proposals include the use of jaws which likewise release the plant when it has reached the drop point.

Problems arising with these prior proposals include the difficulty of aiming the plants into the tubes or the like, having regard to the speed of operation of the machine. There is also a tendency for the leaves of the plant to become caught in the mechanism. Furthermore, these mechanisms have limitations with regard to accurate and well timed release of plant.

Accordingly, there is a considerable need for improvements in one or more of these respects, and it is an object of this aspect of the present invention to provide improvements in one or more of these respects, or generally.

According to this aspect of the invention there is provided plant dispensing apparatus as defined in the accompanying claims. The invention also provides a method of dispensing plants as defined and disclosed herein.

In a perferred embodiment a dispensing or indexing mechanism for a planter comprises a cylindrical or conical drum which is open at one end to receive plants and has an exit in its side for delivery of plants. An impellor is mounted in the drum for rotation about the drum axis to guide plants to the exit or delivery opening. The impellor serves, in use, to impart centrifugal force to the plants or modules, so as to encourage clean delivery. To minimise any tendency for plants to become lodged or jammed in the downwardly tapering chute defined between the impellor and downwardly tapering chute defined between the impellor and the drum, a plate or ledge is provided in the drum to limit downward movement of the plants. The ledge is discontinued at the delivery opening in the drum.

In perferred embodiment, four chutes are defined within the drum by four rectangular flat indexing plates and corresponding angled guide plates. In use, the plants follow a generally downward helical path. The inclination of the indexing mechanism is such that, at the point of discharge, the guide plates are in a vertical plane.

The dispensing mechanism is driven at a speed related to the ground speed of the planter to give the desired spacing between plants. A ground wheel drives the unit via a gear box and a cross-shaft to the multiple row units. The inclination of the dispensing drum enables the operator to have a clear vision of it without having to lean over.

In the perferred embodiment, the guidance provided by the chutes or compartments in the drum is such that plants require very little precision of placement therein, while still being planted correctly. As a result, the apparatus can achieve almost twice the speed of planting compared with previously proposed machines. There is a large target area for the operator to place plants in and this also favours use of the machanism for automatic or semiautomatic feed of modules or plants. On a multi-row planter, the rows can be as close as 12 inches due to the compact form of the dispensing drum. This is due partly to the fact that the operator no longer needs a large multi-element dispenser to provide the opportunity for catch-up after making a mistake.

In the preferred embodiment the number of compartments or chutes in the drum is preferably four, or three, and possibly also two or five. The limiting parameters are the maximum speed at which the operator can feed the impellor, the need to develop sufficient centrifugal force as the plants or modules are dispened, and the desirability of relatively compoactt dispensing apparatus to allow close row spacings. The top opening of the dispensing drum is located close to the trays of plants. In previously proposed apparatus, a large rotor having 6 to 8 sets of jaw-type apparatus is provided for dispensing purposes, due to the difficulty of filling these. The provision of such a large rotor allows time for filling. However, this is unfavourable for close row spacings and due to the catch-up opportunities it presents, encourages an unrhythmic technique in the operator, leading to mistakes and fatigue. The drum/impellor assembly of the described embodiment below is extremely easy to load with plants, and thus needs only three of four sets of plant receiving chutes.

Embodiments of the invention will now be described by way of example with reference to the accmpanying drawings in which:

FIGS. 2 and 3 show, also in side elevation view, a single row unit of the planter of FIG. 1, illustrating the reciprocating movements of a coulter assembly thereof;

FIGS. 5 and 6 show front elevation and side elevation views respectively of hitch means of the planter of FIG. 1;

Figure 1:
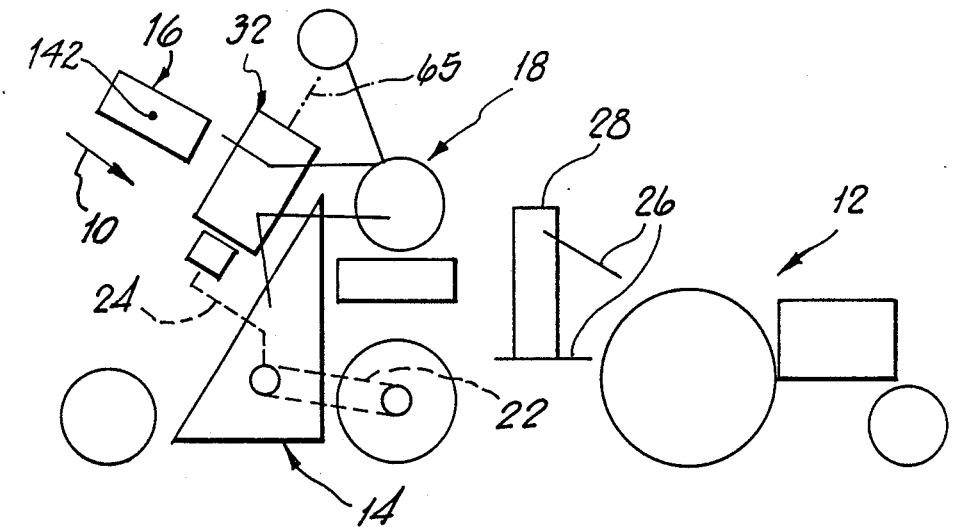
FIG. 1 shows, in purely diagrammatic form, a side elevation view of a planting machine drawn by a tractor.

As shown in FIG. 1, a planter 10 is drawn by a tractor 12. The planter has three or more row units 14 each capable of placing plants from a supply 16 in a furrow in the ground, at regualr intervals, the plants being manually transferred from supply 16 to row unit 14 by an operative 18, one such operative being provided for each row unit.

Planter 10 has at least one ground wheel 20 connected by chain and/or other drives 22, 24 to the mechanisms of the individual row units. The planter is connected to the tractor links 26 by a hitch 28 mounted on the planter. Alternatively, the planter may be semi-mounted or trailed from the tractor.

Figure 3A:
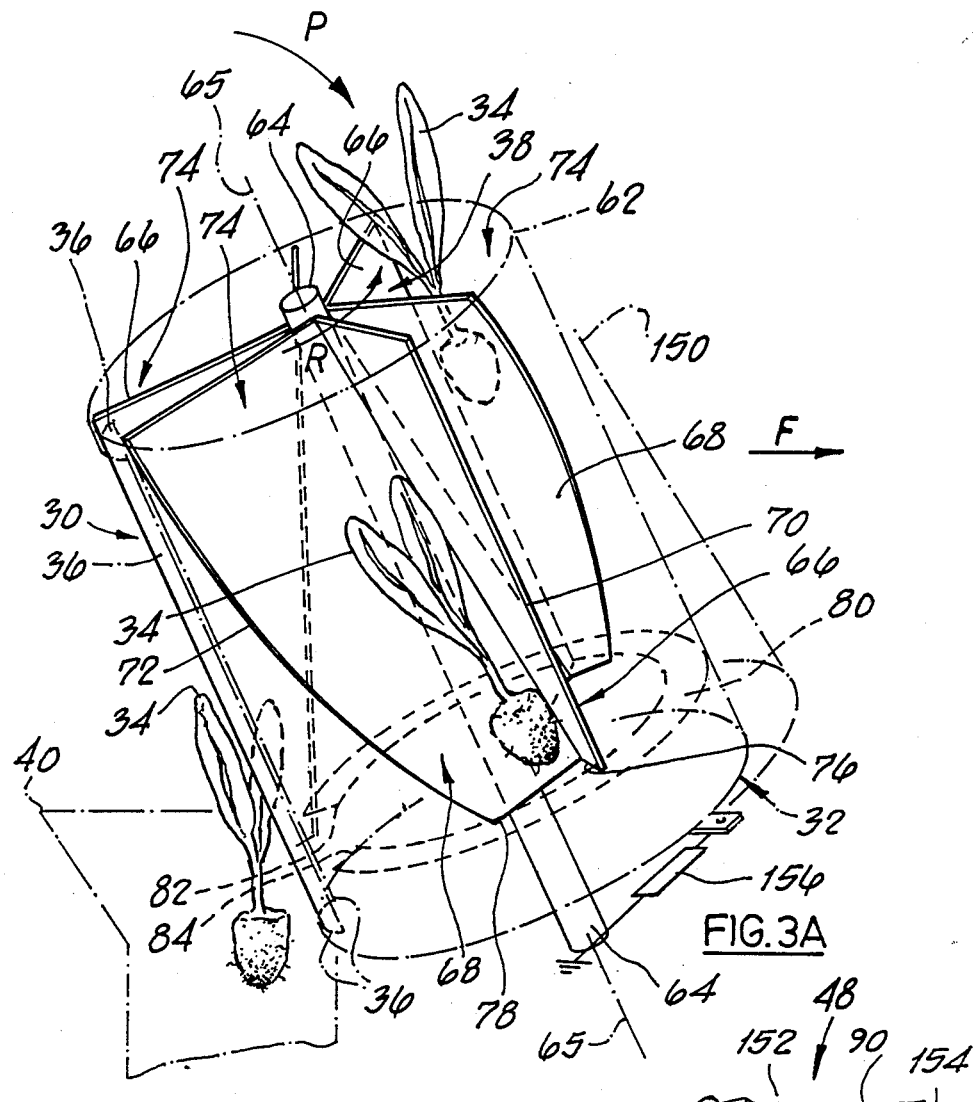
FIG. 3A shows on a larger scale, a perspective view of a dispensing drum of the apparatus of FIG. 2, the direction of viewing being indicated by arrow IIIA in FIG. 2.

As shown in FIGS. 2 and 3, each row unit 14 comprises dispensing apparatus 30 comprising a dispensing drum 32 into which operative 18 places plants 34 from supply 16. The plants are discharged through an opening 36 by an impellor 38 (see FIG. 3A), and then pass via a feed chute 40 to a delivery zone 42 where they are placed in a furrow in the soil 44 and press wheels 46 gather and/or press soil around the plant roots. The furrow in the soil is opened by a coulter 48 having a leading knife edge 50. The coulter is mounted on parallelogram links 52, 54 from a structural member 56 on th planter chassis. A cam 58, rotated by drive 22 acts on an operating lever 60 connected to links 52 to effect reciprocating angular movement thereof, and thus corresponding back-and-forth movement of coulter 48. The return movement of the coulter maybe effected by soil forces arising from forward movement of the planter in direction F through the soil 44. Preferably the cam is arranged itself to provide positive return drive in a similar manner.

Turning now to a more detailed consideration of the structure and operation of the dispensing drum 32, it will be seen in FIG. 3A that the drum comprises a cylindrical open-ended drum member 62, in which the rectangular discharge opening 36 is formed. The opening 36 extends throughout a substantial portion of the height of drum member 62, as shown in FIG. 3A, and its circumferential extent is about 35 degrees of arc, and may be from 25 to 45 degrees of arc. Opening 36 is located with respect to forward travel direction F at 6 o'clock if 12 o'clock represents the most forward point of the periphery of drum 62 with respect ot direction F, or elsewhere according to choice.

Mounted within drum 32 is impellor 38 which comprises a shaft 64 rotatable about its axis 65 and carrying three pairs or impellor plates. Each such pair comprises a radial plate 66 and an inclined plate 68 cooperating with it radial plate. Thus, the radially inner edges of the plates 66 are supported on shaft 64, and the inner edges of the plates 68 are joined to the associated radial plate 66 at an angle to the shaft 64, their radially outer edges 70, 72 respectively are a sliding and cooperating fit within the inner surface of drum member 62. From its upper edge plate 68 extends downwardly and towards the edge 20 of the radial plate 66, which precedes the plate 68 in rotation of the impeller 38 about the axis 65 in the direction indicated by the arrow R thereby defining a downwardly tapering chute 74 into which plants can be placed by operatives 18. Thus, the chute 74 has a wide mouth at its upper end, but has comparatively small dimensions at its lower end. At that lower end, the end edges 76, 78 respectively of plates 66, 68 are in sliding edge-to-face relationship with a generally horseshoe shaped ledge member 80 mounted in drum member 62 and extending arround its inner periphery between ends 82, 84 located close to the upwardly extending side edges of discharge opening 36. Ledge 80 serves to limit downwards movement of plant modules 34 in each of the chutes 74.

In use, operatives 18 place (arrow P) plant modules 34 from supply 16 into chutes 74. The modules can be placed in the chutes at any location about 3 o'clock to about 9 o'clock as the impellor 38 rotates anticlockwise (arrow R in FIG. 3A). The modules are discharged through opening 36 at about 6 o'clock and enter chute 40 and thus pass to coulter 48 for placement in the soil 44. The modules thus follow a generally helical path and are discharged both sideways and downwards, as indicated in FIG. 3A. This simple system of guidance, the downwardly-tapering form of the chutes 74, and the absence of any structures tending to catch in the foilage of the modules, all promotes efficient dispending with a minimal likelihood of the module or its foilage catching on structures of the dispensing mechanism. The downward and outward movement permitted by the drum opening, coupled with the centrifugal forces acting on the modules greatly aid the smooth dispensing action.

Figures 4, 4P:
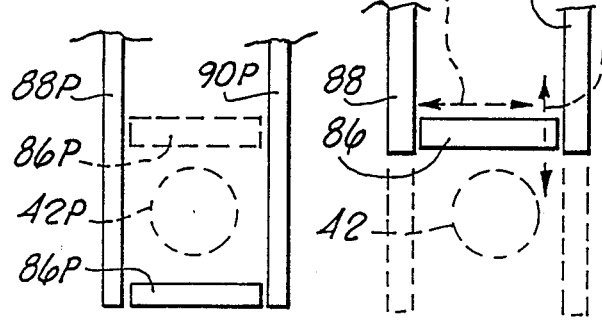
FIGS 4 and 4P shows, purely diagrammatically, plan views of a coulter assembly of the invention and of a prior proposal respectively, the direction of viewing being indicated by arrow IV in FIG. 3.

Turning now to the plant module placement, it can be seen in FIGS. 2 and 3 that the modules 34 are received in delivery zone 42 from chute 40. A placement of delivery plate 86 is located between the side plates 88, 90 (see FIG. 4) of coulter 48. FIG. 4 also indicates the reciprocating movement of the coulter itself and thus of its side plates 88, 90 under the action of the drive provided by cam 58 and level 60. The rear-most position of the side plates is shown in dotted lines in FIG. 4. This corresponds to the FIG. 2 position, and the full line position in FIG. 4 corresponds to the FIG. 3 position of the coulter.

Thus, a plant module placed in delivery zone 42 in the FIG. 2 position of the coulter is initially supported against lateral toppling by the coulter side plates, 88, 90 and then as these plates are drown forwards, placement or delivery plate 86 effectively delivers the modules from the coulter assembly and press wheels 46 gather soil around it and consolidate the soil to complete the opeation.

This simple and effective process is to be contrasted with that of the prior art shown in FIG. 4P in which the coulter side plates 88P and 90P are effectively fixed and the ejector plate 86P reciprocates between the positions shown, traversing the delivery zone 42P and ejecting plants from the coulter. In this way, plants tend to ride up on the already partly of fully closed furrow, as described previously. Moreover, plant and soil material tends to become jammed under and against the reciprocating ejector plate 86P, and indeed plants dropped early are crushed by the plate as it returns to its dotted line position.

It is to be understood that FIGS. 4 and 4P are purely diagrammatic and not representative of dimensions and relative sizes and thicknesses of the components concerned.

FIGS. 5 and 6 show details of the hitching arrangement for planter 10. It has a conventional A-frame 89 having two lower connectors 90 and an upper connection (not shown) to receive the tractor links 26. The A-frame is connected to toolbar 92 by bridge plates 94 which engage and are fixed to the outer side faces 96 of the toolbar, thus leaving the top and bottom faces 98 and 100 respectively free for other purposes. The tool bar itself comprises twin box beams 102, 104 fixed in spaced parallel relationship and defining between them a channel in which are received bolts 106 having associated nuts 108, plates 110 and (112), whereby the row units 14 are freely laterally position-adjustable lengthwise of toolbar 92 in the direction indicated by arrow A in FIG. 5.

Figure 7:
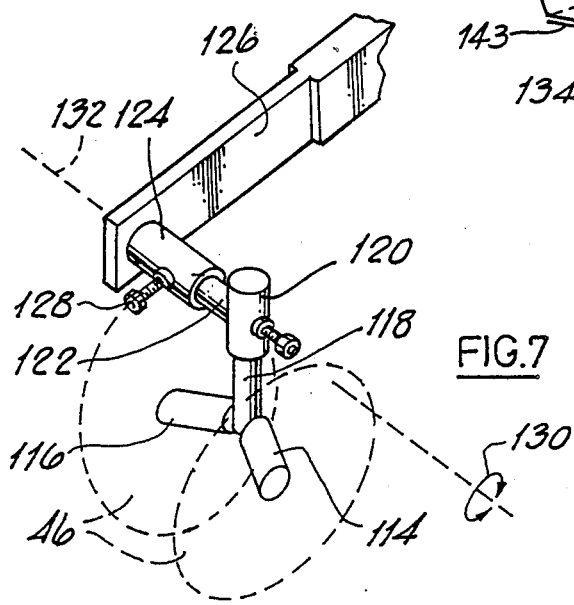
FIG. 7 shows, some what diagrammatically, a perspective view from above and the rear, of the press wheel assembly of the planter of FIGS. 1, 2 and 3.

FIG. 7 shows details of the mounting arrangement for press wheels 46. The twin press wheels are journalled on angled stub shafts 114, 116 projecting from an upright shaft 118. The latter is adjustably received in a sleeve 120 having its own shaft 122 adjustably received in a sleeve 124 projecting from an arm 126 carrying the entire press wheel asembly. Adjustability is thus provided by means of an adjuster bolt 128 to vary the castor angle subtended by shaft 118, by means of angular adjustment (arc 130) about axis 132. In this way, the soil gathering and consolidating effect of the press wheel assembly can be considerably varied according to conditions and crop requirements. It will be appreciated that the assembly also provides for position adjustment axially along axis 132. Also, adjustment can be provided with respect to shaft 118 both axially, lengthwise thereof, and angularly about its longitudinal axis.

Figure 8:
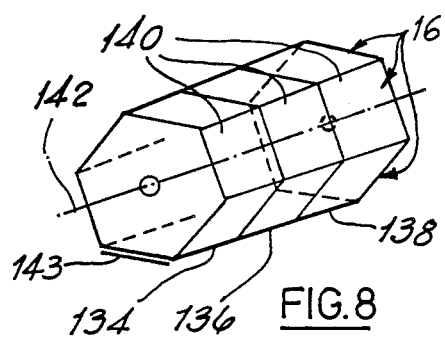
FIG. 8 shows an isometric view of a modification for use in the embodiment of FIG. 1, providing hexagonal magazines of plant trays.

Referring now to FIG. 8, this shows, somewhat diagrammatically, an alternative means for providing a supply of plants for the row units. Instead of simply providing trays 16 of modules, the trays 16 can be mounted on hexagonal magazines or drums 134, 136, 138. Each magazine can carry a tray of modules on each of its rectangular faces 140. The magazines are mounted to be rotatable about a common axis 142, whereby the operative has a six-fold increase in the availability of plant material from the supply. The trays 16 are inserted into retaining slots 143 (only one shown) on the magazines. The individual modules show no tendency to become detached from their trays until positively removed by the operative, feeding them in direction P (see FIGS. 3 and 3a) into the dispensing drum.

Amongst other modifications which could be made in the above embodiments while remaining within the scope of the invention are the following:

1. The provision of a somewhat conical dispenser drum 62, having a profile as indicated by reference numeral 150 in FIG. 3A, with corresponding changes in the impellor to cooperate therewith. In FIG. 3A, the conical profile is shown at one side only, for simplicity.

2. The placement member or plate 86 may be mounted for floating lateral and fore/aft movement as indicated by arrows 152 and 154 in FIG. 4. Any suitable mounting may be provided for this purpose. It does not affect the relative movement between the coulter and the placement member as such, but simply facilitates smooth operation and cleaning.

3. An actuator 156 (see FIG. 3A) may be provided for angular adjustment of dispensing drum 62 about its longitudinal axis to improve the dispensing action.

4. Modificiations may likewise be made to the shape of the discharge opening 36. It may also be provided with adjustable shutters to enable the opening to be varied during use, or for different plants or conditions.

5. The driveline 22, 24 may be provided with adjustment means to permit adjustment of the timing between the dispensing drums and the coulters. This permits adjustment to take account of the differences in time taken for plants of different sizes and different kinds to reach the furrow.

6. A membrance may be provided to inhibit soil from entering the coulter assembly behind the dispalcement member, and lodging in the coulter.

7. The dispenser drum may itself be mounted for position adjustment relative to its driving shaft to enable timing modifications to be made.

8. Provision may be made for application of liquids and chemicals during planting. The drives to the row units may be arranged to trigger water or fertilizer or granule application as required.

9. A rotary slit cutting blade may be mounted ahead of the coulter to facilitate the latter's passage through the soil.

10. The coulter or a forward portion of it may be fixed and plant support plates or a rear portion of the coulter may be reciprocated.

11. Modification of the coulter/plant support plate movement perameters to suit particular requirements. In the above embodiment the amplitude of the coulter movement is about 60 millimeters for a module root block width of about 20 to 25 millimeters. This could be varied to take account of different module sizes, subject to the limitations imposed by the rate of planting required (say, 80 to 120 plants per minute at spacings of 15, 20, 25 centimeters or more between plants in each row)

12. The coulter may have a bolt-on detachable lower portion permitting replacement after wear and to permit alteration of furrow profile.

I claim:

1. A mobile planter placement of plants in the ground in sequence, said plants being in a supply provided on said planter, said planter comprising:
   a mobile support structure;
   at least one row unit mounted on said support structure to perform planting operations, each row unit including a plant dispensing apparatus for receiving plants from said supply and delivering said plants into a delivery zone for placement in the ground, said dispensing apparatus having a drum with an internal rotatable impeller cooperating with the side wall of said drum to define chutes in said drum for guiding received plants towards said delivery zone, said drum being open at its upper end exposing an inlet to said chutes and having a discharge opening in the side wall of said drum partially exposing said chutes, said discharge opening being positioned above said delivery zone, said drum being mounted to the row unit for rotating, in use, about an axis extending between the upper and lower drum ends, said axis being inclined from the vertical, said discharge opening being in the lower portion of said drum wall, said plants being subject to dropping from said drum chutes in sequence through said discharge opening towards said delivery zone;
   each row unit further including furrow opening means for opening a furrow in the ground, said furrow opening means defining said delivery zone;
   drive means for rotating, in use, said impeller about said axis.

2. A mobile planter as claimed in claim 1, wherein said row unit further includes a feed chute between said drum discharge opening and said delivery zone, said plants discharged from said drum falling in said sequence through said feed chute by gravity to said delivery zone.

3. A mobile planter as claimed in claim 1, wherein said impeller has a central shaft, said being mounted at the ends of said drum for rotation about its lengthwise axis, said chutes in said drum including plates mounted for rotation with said shaft, the space between adjacent plates defining one of said drum chutes.

4. A mobile planter as claimed in claim 3, wherein each said drum chute includes a plate extended generally radially with respect to said shaft and an inclined plate intersecting said radial plate, said inclined plate intersecting said radial plate near said shaft at the upper end of said drum, said intersection extending radially outward along said radial plate as said inclined plate extends towards said lower drum end, said drum chute defined between said two intersecting plates tapering downwardly in cross-sectional area.

5. A mobile planter as claimed in claim 4, wherein said lower end of said drum is partially closed by a circumferential ledge extending inwardly towards said rotating axis, said impeller terminating above said ledge, said ledge having a circumferental gap, said gap being aligned with said discharge opening in said drum.

6. A mobile planter as claimed in claim 7, wherein said reciprocating motion is in the direction of planter travel during planting operation of said mobile planter.

7. A mobile planter for placement of plants in the ground in sequence, said plants being in a supply provided on said planter, said planter comprising:
   a mobile support structure;
   at least one row unit mounted on said support structure to perform planting operations, each said row unit including plant delivering means for delivering plants dispensed from said supply to a delivery zone for placement in sequence in the ground, each row unit further including furrow opening means for opening a furrow in the ground, and plants support members connected with said furrow opening means, said plant support members being spaced apart and having said delivery zone located therebetween, said delivery zone being, in use, in said furrow opening in the ground, said plant support members being mounted for reciprocating motion, said reciprocating movement being relative to said support structure;
   a plant placement member located between said plant support members attached to the support structure said plant support members providing laterial boundaries for said delivery zone, said placement member providing an end boundary for said delivery zone;

drive means for effecting said reciprocating movement of said plant support members, said drive means being adapted to move said plant support members in the forward travel direction of said mobile planter relative to said support structure and relative to said placement member for each plant in said sequence, reciprocal motion of said plant support members laterally exposing said delivery zone leaving plants, delivered in sequence to said delivery zone, at their growing locations in said furrow.

8. A mobile planter as claimed in claim 7, wherein said furrow opening means includes a coulter, and said drive means includes rotatable cam means for reciprocating said plant support members.

9. A mobile planter as claimed in claim 8, wherein said coulter is mounted on said support structure by pivotably mounted links.

10. A mobile planter as claimed in claim 9, wherein said links are disposed in parallel relationship to form a parallelogram linkage.

11. A mobile planter as claimed in claim 8, wherein said placement member is a plate mounted on said support structure and fixed relative thereto, said plate extending transversely between said plant members.

* * * * *